United States Patent [19]

Dixon

[11] 4,180,633

[45] Dec. 25, 1979

[54] PREPARATION OF INSOLUBLE POLYVINYLPYRROLIDONE

[75] Inventor: Kenneth W. Dixon, Sewickley, Pa.

[73] Assignee: GAF Corporation, New York, N.Y.

[21] Appl. No.: 936,019

[22] Filed: Aug. 23, 1978

Related U.S. Application Data

[62] Division of Ser. No. 809,943, Jun. 24, 1977, Pat. No. 4,139,688.

[51] Int. Cl.² .......... C08F 8/18; C08F 8/20

[52] U.S. Cl. .......... 525/359; 525/336; 525/340; 525/354; 525/383

[58] Field of Search .......... 526/46

[56] References Cited

U.S. PATENT DOCUMENTS

| | | | |
|---|---|---|---|
| 2,212,786 | 8/1939 | McQueen | 526/41 |
| 3,314,909 | 4/1967 | Whitfield et al. | 526/41 |
| 3,910,862 | 10/1975 | Barabas et al. | 526/46 |
| 4,139,688 | 2/1979 | Dixon | 526/27 |

FOREIGN PATENT DOCUMENTS

| | | | |
|---|---|---|---|
| 1115021 | 4/1959 | Fed. Rep. of Germany | 526/41 |
| 4414576 | 9/1964 | Japan | 526/46 |
| 48-7708 | 3/1973 | Japan | 526/46 |
| 1397743 | 6/1963 | United Kingdom | 526/41 |
| 374329 | 6/1973 | U.S.S.R. | 526/46 |
| 448190 | 6/1973 | U.S.S.R. | 526/27 |

*Primary Examiner*—William F. Hamrock

*Attorney, Agent, or Firm*—Walter C. Kehm; Sheldon H. Parker; Joshua J. Ward

[57] ABSTRACT

Insoluble cross-linked homopolymers of vinylpyrrolidone or copolymers of vinylpyrrolidone are prepared by reaction of the soluble homopolymer or copolymer with certain acid chlorides at a temperature between 75° C. and about 140° C., to obtain a precipitate. Alternately, the insoluble product may be prepared by heating a partial amide chloride of a homopolymer or copolymer of vinylpyrrolidone.

9 Claims, No Drawings

PREPARATION OF INSOLUBLE POLYVINYLPYRROLIDONE

This is a division of application Ser. No. 809,943, filed June 24, 1977 and now U.S. Pat. No. 4,139,688.

BACKGROUND OF THE INVENTION

This invention provides a new process for the preparation of insoluble polyvinylpyrrolidone, by means of crosslinking vinylpyrrolidone polymers. Insoluble polyvinylpyrrolidones have heretofore been prepared by various methods. For example, U.S. Pat. No. 2,927,913 and U.S. Pat. No. 2,938,017 teach their preparation by polymerization of vinylpyrrolidone in the presence of various salts and bases, respectively. Insoluble polyvinylpyrrolidones can also be prepared by copolymerization of vinylpyrrolidone with various other monomers such as, for example, cyclic acid amides and oxidizable metals (U.S. Pat. No. 3,759,880, U.S. Pat. No. 3,933,766, German Pat. No. 2,059,484) and other ethylenically unsaturated substances U.S. Pat. No. 3,941,718). Another method of obtaining insoluble polyvinylpyrrolidones has been to treat the soluble polymer with materials capable of generating free radicals such as hydrazine or hydrogen peroxide (British Pat. No. 1,022,945), an inorganic water soluble persulfate (U.S. Pat. No. 2,658,045) or certain diolefins (Belgian Pat. No. 672,449).

The present invention provides a method for preparing insoluble polyvinylpyrrolidones from the soluble polymers, which method is considerably easier in operation than previous methods and which is capable of producing polymers of varied and controlled cross-linked density.

SUMMARY OF THE INVENTION

Insoluble homopolymers or copolymers of vinylpyrrolidone are prepared by reacting the soluble polymer with certain acid chlorides at a temperature between about 75° and about 140° C., during which there is formed an amide chloride intermediate which cross-links to provide the insoluble polymer. Alternatively, one can use the amide chloride as the starting material and obtain the insoluble product by heating at a temperature sufficient to effect the cross-linking.

DETAILED DISCLOSURE

The preferred starting material for the process of this invention is typically a soluble homopolymer or copolymer of vinylpyrrolidone. When the substance is a copolymer, the comonomers may be, for example vinyl acetate, methyl methacrylate, ethyl acrylate, vinyl chloride, styrene, ethylhexyl maleate, isobutylvinyl ether, acrylonitrile. The term "copolymer" as used herein includes polymers of vinylpyrrolidone with one or more of the monomers specified and/or other monomers copolymerizable therewith.

The acid chloride reactant is, for example, thionyl chloride, phosgene, phosphorus trichloride, phosphorus pentachloride, oxalyl chloride, and the like. Preferred are thionyl chloride and phosgene.

The reaction medium is preferably a solvent in which the acid chloride reactant is soluble and in which the polymer starting material may be soluble. However, it is not required that either the acid chloride or the polymer be soluble in the medium. A wide variety of solvents may be employed. The solvent chosen must be one which does not react with the vinylpyrrolidone polymer or with the acid chloride. Suitable solvents include hydrocarbons (aliphatic and aromatic) chlorinated hydrocarbons, ketone and ethers. Examples of suitable solvents are benzene, toluene, xylene, n-heptane, cyclohexane, chlorobenzene, n-octane, ethylene glycol dimethyl ether etc.

The soluble vinylpyrrolidone polymer is dissolved or suspended in the solvent, heated to reflux temperature and the acid chloride is added. The reaction mixture is kept at a temperature between about 75° and about 140° C., such as, for example, the reflux temperature of the solvent, until cross linking of the vinyl pyrrolidone polymer is completed. The precipitate is then separated in the usual manner.

Reaction temperature is not critical, but it has been found that a range of from about 75° to about 140° C., preferably from 90° to 120° C. is appropriate, owing to the speed of reaction within this range. Suitable solvents boiling in this range include the so-called high boiling alkanes and aromatics, particularly those mentioned specifically above.

The ratio of polyvinylpyrrolidone polymer and acid chloride reactant varies according to the amount of cross-linking desired in the final insoluble product. In theory, the amount of acid chloride to be used will have a stoichiometric relationship to the percentage of the amide unit in the polyvinylpyrrolidone desired to be modified to amide chloride units of the intermediate. Cross linking has been found to occur at molar ratios of acid chloride to polymer amide units as low as 1:10. For most purposes, the preferred molar ratio of acid chloride to amide units is from 0.5:1 to 1:1. An excess of acid chloride may be used (it having been discovered that satisfactory cross-linking occurs at a molar ratio of acid chloride to amide units of 3:1), but it is not economically attractive.

Alternate starting materials for the process of this invention are the amide chlorides and partial amide chlorides of vinylpyrrolidone polymers described in my co-pending application Ser. No. 809,942 filed concurrently herewith and entitled "Modified Tertiary Amide Polymers". These amide chlorides are slurried with a suitable liquid medium and heated to the reflux temperature. The liquid medium may be any of the solvents described above. The temperature is maintained for a sufficient time for the crosslinking of the product to be complete. The product is then separated according to methods well known in the art.

Insoluble polyvinylpyrrolidone products are useful as components of pharmaceutical compositions and in the beverage industry.

This invention will be better understood by reference to the following examples, which are included here for illustrative purposes only and are not to be construed as limitations.

EXAMPLE 1

To a 100 ml. flask equipped with magnetic stirrer, thermometer and condenser, were added 5.0 g. of the partial amide chloride of polyvinylpyrrolidone (K-90 available from GAF Corporation, average molecular weight 360,000) and 50 ml. of dry xylene. The slurry was heated to reflux, where evolution of hydrochloric acid began. After 2 hours, no more hydrochloric acid was evolved. The mixture was cooled to 80° C. and 2 ml. of water was added. After refluxing an additional half an hour, the slurry was cooled and filtered. After drying, 3.6 g. of an off-white solid was recovered. The solid was insoluble in water and other organic solvents.

EXAMPLE 2

To a 250 ml. flask equipped with mechanical stirrer, thermometer, dropping funnel and condenser were added 30.0 g. of polyvinylpyrrolidone (K-90) and 100 ml. of dry heptane. The suspension was heated to reflux and 32.1 g. of thionyl chloride was added dropwise over 45 minutes. The suspension was refluxed for 3 hours then cooled. After washing, the dried product weighted 33.2 g. and contained 10.73% chlorine.

EXAMPLE 3

To a 250 ml. flask equipped as in Example 2 were added 30.0 g. of dried polyvinylpyrrolidone (K-30 available from GAF Corporation, average molecular weight 40,000) and 100 ml. of Ultrasene ®, a high boiling kerosene available from Atlantic Richfield. The suspension was heated to 120° C. under a nitrogen atmosphere and 32.1 g. of thionyl chloride was added over 45 minutes. The temperature was maintained for 3 hours, then the suspension was cooled and filtered. The product, 40.0 g., was found to contain 14.92% chlorine.

I claim:

1. A process for the preparation of insoluble homopolymers or copolymers of vinylpyrrolidone which comprises refluxing uncross-linked polyvinylpyrrolidone or an uncross-linked copolymer of vinylpyrrolidone with an acid chloride selected from the group consisting of phosgene, and oxalyl chloride in a liquid medium at a temperature between about 75° and about 140° C., to obtain a precipitate of cross-linked polyvinylpyrrolidone or of a cross-linked copolymer of vinylpyrrolidone.

2. A process according to claim 1 in which the liquid medium is a solvent for the acid chloride.

3. A process according to claim 2 in which the solvent is also a solvent for the polyvinylpyrrolidone or the copolymer of vinylpyrrolidone.

4. A process according to claim 1 in which the acid chloride is phosgene.

5. A process according to claim 1 in which the reaction temperature is from 90° to 120° C.

6. A process according to claim 1 in which the acid chloride is oxalyl chloride.

7. The product of the process of claim 1.

8. The product of the process of claim 4.

9. The product of the process of claim 6.

* * * * *